US012297566B2

United States Patent
Lindinger et al.

(10) Patent No.: US 12,297,566 B2
(45) Date of Patent: May 13, 2025

(54) SPRING ELEMENT FOR UPPER NIPPER OF A COMBING MACHINE

(71) Applicant: Maschinenfabrik Rieter AG, Winterthur (CH)

(72) Inventors: Bodo Lindinger, Zimmern (DE); Ueli Stutz, Winterthur (CH)

(73) Assignee: Maschinenfabrik Rieter AG, Winterthur (CH)

( * ) Notice: Subject to any disclaimer, the term of this patent is extended or adjusted under 35 U.S.C. 154(b) by 52 days.

(21) Appl. No.: 17/709,643

(22) Filed: Mar. 31, 2022

(65) Prior Publication Data

US 2022/0389625 A1   Dec. 8, 2022

(30) Foreign Application Priority Data

Jun. 7, 2021   (CH) ..................................... 00661/21

(51) Int. Cl.
*D01G 19/16* (2006.01)
*D01G 19/10* (2006.01)

(52) U.S. Cl.
CPC ............. *D01G 19/16* (2013.01); *D01G 19/10* (2013.01)

(58) Field of Classification Search
CPC . D01G 19/16; D01G 19/10; F16F 1/04; F16F 1/06; F16F 1/12; F16F 1/38; F16F 2230/007; F16F 2230/10; F16F 1/128; F16F 2238/026
See application file for complete search history.

(56) References Cited

U.S. PATENT DOCUMENTS

| 2,705,818 | A | | 4/1955 | Kalwaites |
| 2,900,674 | A | | 8/1959 | Werth |
| 3,479,699 | A | * | 11/1969 | Anderson ............. D01G 19/16 |
| | | | | 19/225 |

(Continued)

FOREIGN PATENT DOCUMENTS

| CN | 201560261 U | * | 8/2010 |
| CN | 103 088 475 A | | 5/2013 |

(Continued)

OTHER PUBLICATIONS

Swiss Patent Office Search Report, Jan. 12, 2022.
EPO Search Report, Sep. 26, 2022.

*Primary Examiner* — Aiying Zhao
(74) *Attorney, Agent, or Firm* — Dority & Manning, P.A.

(57) ABSTRACT

A spring element for an upper nipper of a combing machine has a first element with a through opening arranged transversely to a longitudinal axis. A second element has an internal thread for fastening a shaft adapter, and a guide opening with an opening width as well as a passage opening arranged in the longitudinal axis on a side of the guide opening facing away from the internal thread. A compression spring is arranged between the first and second elements. A connecting element is held in the bore of the first element and projects through the passage opening of the second element into the guide opening, the connecting element having a larger diameter than the passage opening on a side thereof opposite the first element. The first element has a tubular lug overlapping the compression spring, and the second element has a sleeve overlapping the compression spring and the lug.

10 Claims, 3 Drawing Sheets

(56) References Cited

U.S. PATENT DOCUMENTS

| | | | | | |
|---|---|---|---|---|---|
| 3,600,758 | A | * | 8/1971 | VonKaenel | ............ D01G 19/06 19/225 |
| 3,991,863 | A | * | 11/1976 | Lee | ......................... F16F 9/486 267/221 |
| 5,467,506 | A | * | 11/1995 | Nishikawa | ............. D01G 19/16 19/115 R |

FOREIGN PATENT DOCUMENTS

| | | | | | |
|---|---|---|---|---|---|
| CN | 104 912 977 | A | | 9/2015 | |
| CN | 209906948 | U | * | 1/2020 | |
| DE | 10 03 618 | B | | 2/1957 | |
| DE | 42 16 485 | A1 | | 11/1993 | |
| DE | 197 43 543 | A1 | | 4/1999 | |
| DE | 202006000743 | U1 | * | 5/2006 | .............. F16F 1/125 |
| GB | 191201963 | A | * | 11/1912 | .............. D01G 19/02 |
| GB | 811556 | A | * | 4/1959 | ................ F16F 9/38 |
| GB | 845948 | A | * | 8/1960 | ............. D01G 19/26 |

* cited by examiner

SPRING ELEMENT FOR UPPER NIPPER OF A COMBING MACHINE

FIELD OF THE INVENTION

The invention relates to a spring element for an upper nipper of a combing machine having a compression spring clamped between two elements.

The invention also relates to a nipper mechanism on a combing machine, the nipper plate of which is located on nipper arms and is moved back and forth together with the upper nipper by means of an arm fixed on an oscillating drive shaft, and the upper nipper of which, also located on corresponding nipper arms, is pivotably mounted on the nipper plate. The closing movement of the upper nipper being provided by a yoke that is movably mounted on two swivel joint points. This yoke (or spring element) has the task of facilitating the movement of the upper nipper together with the nipper plate after the upper nipper has been placed on the nipper plate and at the same time also generating the clamping pressure required to hold a fiber tuft between the nippers by the spring force of the spring element. The spring elements hold the nipper unit sufficiently open in the front end position at a desired point in time, while they gently close the nipper unit in a return movement into a rear end position and then hold it closed with a constant force.

BACKGROUND

The use of generic spring elements is already known from DE 42 16 485 A1. The spring elements are made up of two end elements with a compression spring situated therebetween. The two end elements are connected to each other by a connecting pin. On the one hand, the connecting pin serves to prestress the compression spring and, on the other hand, a stable longitudinal axis of the spring element is determined by the connecting pin. For this purpose, the connecting pin is connected to one of the end elements in a stationary manner and is guided in the second end element in the longitudinal axis. As a result, the end elements can move relative to one another on the longitudinal axis with the resistance of the compression spring clamped therebetween. With each movement, the end element is brought into a stop on the connecting pin. The impact of the end element in the stop results in high surface pressures, which has a negative effect on the service life of the affected components. The end element, in which the connecting pin slides back and forth, is made of a plastics material in order to achieve the best possible sliding properties. However, this has the disadvantage that high wear and tear also occurs at high cycle rates.

CN 209 906 948 U is intended to remedy this disadvantage. CN 209 906 948 U also shows a spring element for use in a combing machine. In this case, bearing bushes are used between the connecting pin and the two end elements in order to achieve an improvement in the sliding properties when metal end elements are used at the same time while the spring element is compressed or relieved. However, also in the proposed solution there has been no improvement in the stresses on the contact surface between the connecting pin and the end element. A metal or rubber bellows enclosing the pressure spring is provided to protect against soiling and thus faster wear. With today's usual high number of nips, however, the service life of such dust protection elements, such as bellows, is severely limited. In the event of improper handling, they are often already damaged even before they are inserted in the machine. Another disadvantage of the embodiment shown is that the pulsating forces occurring on the connecting pin result in rapid material fatigue due to the small diameter of the pin.

SUMMARY

An object of the invention is therefore to create a spring element which offers resistant protection against soiling. A further object of the invention is to create a spring element which has an improved connection of the end elements by means of the connecting pin and thus withstands the high loads. Additional objects and advantages of the invention will be set forth in part in the following description, or may be obvious from the description, or may be learned through practice of the invention.

The objects are achieved by a device having the features described herein.

A spring element for an upper nipper of a combing machine is proposed having a longitudinal axis and having a first element with a through opening arranged transversely to the longitudinal axis for fastening to an axle and having a bore running in the longitudinal axis. Furthermore, the spring element comprises a second element having an internal thread arranged in the longitudinal axis for fastening a shaft adapter and having a guide opening arranged in the longitudinal axis with an opening width and having a passage opening arranged in the longitudinal axis on a side of the guide opening facing away from the internal threads. Furthermore, the spring element comprises a compression spring, the compression spring being arranged in the longitudinal axis between the first element and the second element, and a connecting element, the connecting element being held stationary in the longitudinal axis in the bore of the first element and being guided so as to project through the passage opening of the second element into the guide opening of the second element and having a larger diameter than the passage opening on the side of the second element opposite the first element. The compression spring can be designed, for example, as a wire spring or sheet metal spring in a cylindrical or conical design or be composed of, for example, a plurality of spring elements. Compression springs having a linear or progressive spring constant or combinations thereof can also be used. The first element has a tubular lug which is positioned partially overlapping the compression spring in the longitudinal direction and the second element has a sleeve overlapping the compression spring and the lug of the first element. An encapsulation of an interior space of the spring element is achieved by an overlapping of the lug of the first element with the sleeve of the second element. An annular gap that forms between the lug and the sleeve in the overlapping region is kept as small as possible.

A seal is advantageously provided between the sleeve and the lug. To further improve the encapsulation, a seal can be placed between the lug and the sleeve, which seal is attached to the lug or to the sleeve. The seal prevents dirt or dust from entering an interior space of the two elements. This prevents rapid wear of the mechanically moving parts between the elements. Preferably, the seal is held in a groove, the groove being provided in the sleeve or the lug. Placing the seal in a groove provided for this purpose prevents the seal from slipping or working out of the annular gap as a result of the movements of the spring element. Alternatively, the seal is fastened to the sleeve or to the lug by gluing, it also being possible for the seal to be secured in the groove using an adhesive.

Preferably the seal is made of felt or rubber. Such seals have good sliding properties and are wear-resistant. Alternatively, if there is a groove in the lug, a brush seal can also be placed in the groove.

In an alternative embodiment, the lug and/or the sleeve can be designed in their overlapping region in such a way that a labyrinth seal is formed. The version of the seal made up of a lug and an overlapping sleeve makes for movement independent of each other due to their design. There is no contact between the two components, nor are the lug or the sleeve mechanically stressed. This prevents fatigue of the materials as well as wear.

Advantageously, the opening width corresponds to at least 1.4 times the diameter of the passage opening. As a result, a correspondingly large annular surface is achieved, which is formed at the transition from the passage opening to the guide opening. The opening width is preferably at least 1.5 times larger than the diameter of the passage opening. The large annular surface reduces the surface pressure if the spring element is relaxed or the two elements are moved apart the maximum amount. Due to the low surface pressure, it is also possible to manufacture the second element from a plastics material. Manufacturing from a plastics material has advantages in terms of the weight of the spring element, which in turn has a positive effect on the fatigue strength due to the high cycle rates in the movement of the spring element.

Advantageously, the bore in the first element has an internal thread and the connecting element is screwed into the first element, a pin or a lock nut or an adhesive being provided to secure the screw connection. By screwing the connecting element into the first element, a stationary connection is created in a simple manner, and the connecting element is arranged exactly in the longitudinal axis of the spring element.

It is also advantageous if a guide sleeve is inserted to guide the connecting element in the guide opening. By inserting the guide sleeve into the second element, a material pairing of guide sleeve and connecting element that is improved for the loads can be achieved. The pairing of materials is also independent of the choice of material for the second element itself. The guide sleeve can, for example, be made of a sliding material such as bronze or Teflon.

Preferably, the connecting element is formed from a connecting pin and a guide bush held on the connecting pin, the connecting pin having an outer threading at an end facing the first element for connection to the first element and a means for connection to the guide bush at an end facing the second element. The connecting pin is screwed to the first element and is thus held in the longitudinal axis. Furthermore, the guide pin reaches through the passage opening of the second element and is connected to the guide bush. The connection can be realized by a screw connection. An outer diameter of the guide bush is larger than the passage opening, so that when the connecting pin is screwed together with the guide bush, the first element and the second element are drawn together, which leads to a pretensioning of the compression spring. The connecting means can, for example, also consist of a bayonet closure or a different type of coupling. In the case of an embodiment with a coupling, in contrast to a screw connection, only an adjustment of the compression spring that is predetermined by the length of the connecting pin is possible.

In an alternative embodiment, the connecting element consisting of the connecting pin and the guide bushing is designed in one piece. As a result, the two elements are already brought together by screwing the connecting means into the first element. The advantage here is that there is only one screw connection, resulting in simpler assembly and greater operational reliability of the spring element.

It is also advantageous if the connecting element is guided in the longitudinal axis by the connecting pin in the guide opening of the first element and guided by the guide bushing in the guide sleeve of the second element. Two guides that are spaced apart in the longitudinal axis improve the loads and avoid a possible canting of the linear guide of the second element on the connecting element.

A height of the compression spring is advantageously matched to the length of the connecting element in such a way that the fastening of the connecting pin in the first element and in the second element prestresses the compression spring. If the connecting element is made in one piece, the length of the connecting element from the external thread, which is screwed into the first element, until the enlargement of the diameter after the passage opening is not adjustable by the second element. Accordingly, the length of the compression spring must be matched to the connecting means in order to achieve pretensioning of the compression spring when the connecting means is installed.

Advantageously, the opening width is larger in a region of the guide bush than in a region of the passage opening of the second element. The increase in cross section in the region of the guide bush reduces the load on the connecting pin because a larger guide sleeve can be installed accordingly. The lateral forces acting on the connecting pin are reduced, thereby counteracting a breakage of the connecting pin due to overload.

A combing machine is also proposed having at least one spring element as described above.

BRIEF DESCRIPTION OF THE DRAWINGS

The invention is described below on the basis of an exemplary embodiment and explained in more detail with the drawings, in which.

DETAILED DESCRIPTION

Figure 1:
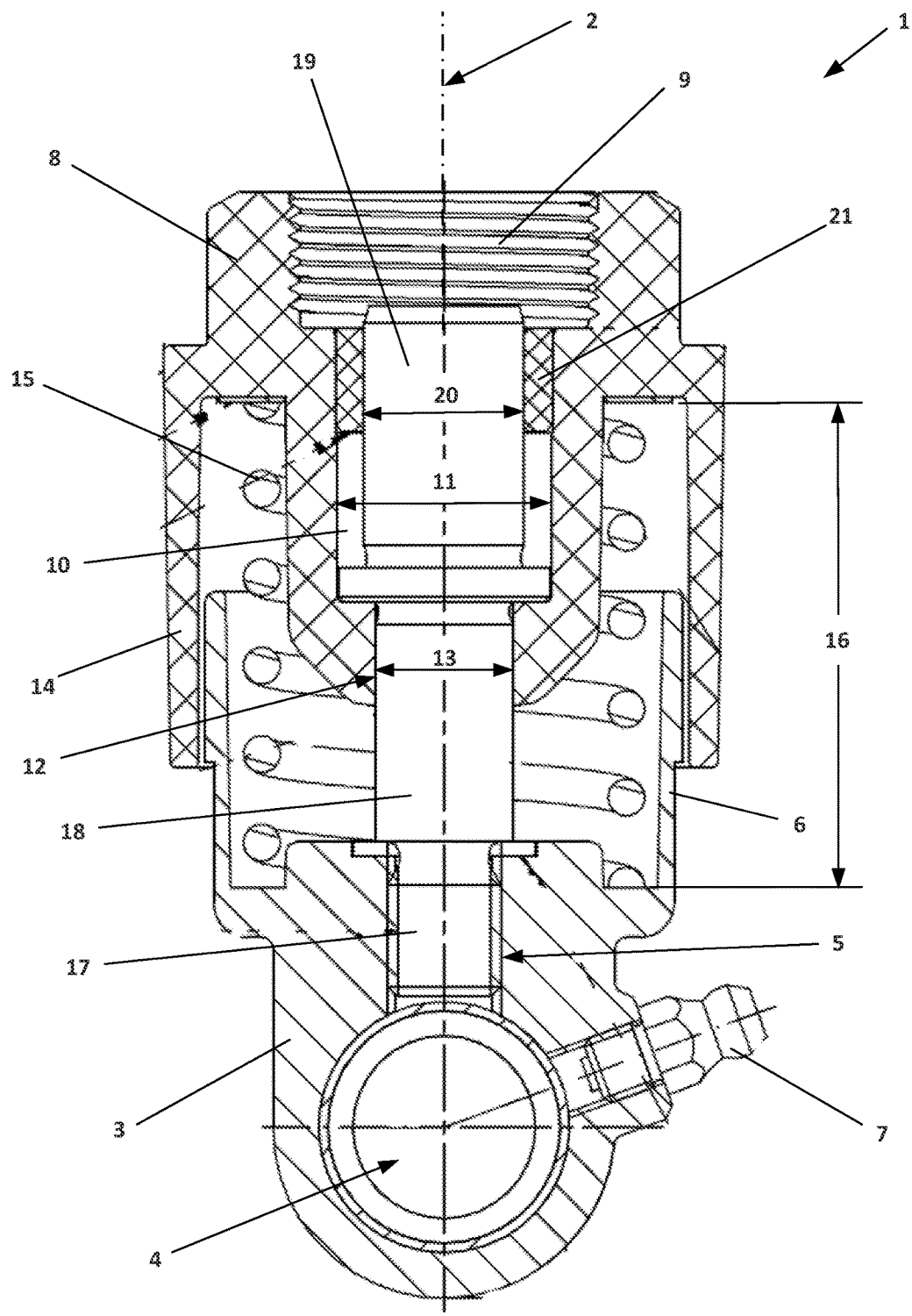
FIG. 1 is a schematic view of a first embodiment in a longitudinal section.

Reference will now be made to embodiments of the invention, one or more examples of which are shown in the drawings. Each embodiment is provided by way of explanation of the invention, and not as a limitation of the invention. For example features illustrated or described as part of one embodiment can be combined with another embodiment to yield still another embodiment. It is intended that the present invention include these and other modifications and variations to the embodiments described herein.

FIG. 1 shows a schematic view of a spring element 1 in a longitudinal section in a first embodiment. The spring element 1 has a longitudinal axis 2 and has a first element 3 and a second element 8 with a compression spring 15 held between the two elements 3 and 8. The two elements 3 and 8 are connected to one another in the longitudinal axis 2 by a connecting element 17. The connecting element 17 consists of a connecting pin 18 and a guide bush 19, the connecting pin 18 and the guide bush 19 being designed as a one-piece connecting element 17. The first element 3 has a through opening 4 which is arranged perpendicularly to the longitudinal axis 2 and serves to accommodate an axle. A lubricating nipple 7 is provided that is directed toward this through opening 4. The connection of the first element 3 to the axle can thus be lubricated. In the longitudinal axis 2, a bore 5 is provided in the first element 3 which has an internal thread in the embodiment shown. Correspondingly, the connecting pin 18 is provided with an external thread which is screwed into the internal thread of the first element 3. A tubular lug 6 is also formed on the first element 3 and partially overlaps the compression spring 15.

The second element 8 is provided with an internal thread 9 on a side facing away from the first element 3 in the longitudinal axis 2. This serves for screwing in a shaft adapter (not shown). Starting from the internal thread 9 in the direction of the first element 3, a guide opening 10 having an opening width 11 and a passage opening 12 having a diameter 13 follow in the longitudinal axis 2. The opening width 11 is greater than the diameter 13 of the passage opening 12. A guide sleeve 21 is installed in the guide opening 10.

The connecting element 17 engages in the longitudinal axis 2 of the guide sleeve 21 via the passage opening 12 of the second element 8 into the internal thread of the first element 3. Due to the fact that in the region of the guide bush 19 the diameter 20 of the connecting element 17 is greater than the diameter 13 of the passage opening 12, when the connecting element 17 is inserted the second element 8 is pulled against the spring force of the compression spring 15 toward the first element 3 and accordingly the compression spring 15 is pretensioned to a height 16. The connecting element 17 is held stationary in the bore 5 of the first element 3 by the screw connection, whereas the second element 8 can slide back and forth on the connecting element 17 in the direction of the longitudinal axis 2 when the compression spring 15 is compressed or relaxed. The connecting element 17 is linearly guided on the connecting pin 18 in the region of the passage opening 12 and on the guide bushing 19 in the region of the guide sleeve 21.

The second element 8 also has a sleeve 14 formed in the direction of the first element 3. The sleeve 14 is integrally formed onto the second element 8 and on the one hand encompasses the compression spring 15 and at least partially the lug 6 of the first element 3. Only a small annular gap remains between the lug 6 and the sleeve 14, so that the compression spring 15 and the connecting element 17 are protected from soiling. An arrangement of lug 6 and sleeve 14 is chosen so that even if the height 16 changes when the compression spring 15 moves, there is a sufficiently long overlap of the sleeve 14 over the lug 6 to protect the components.

Figure 2:
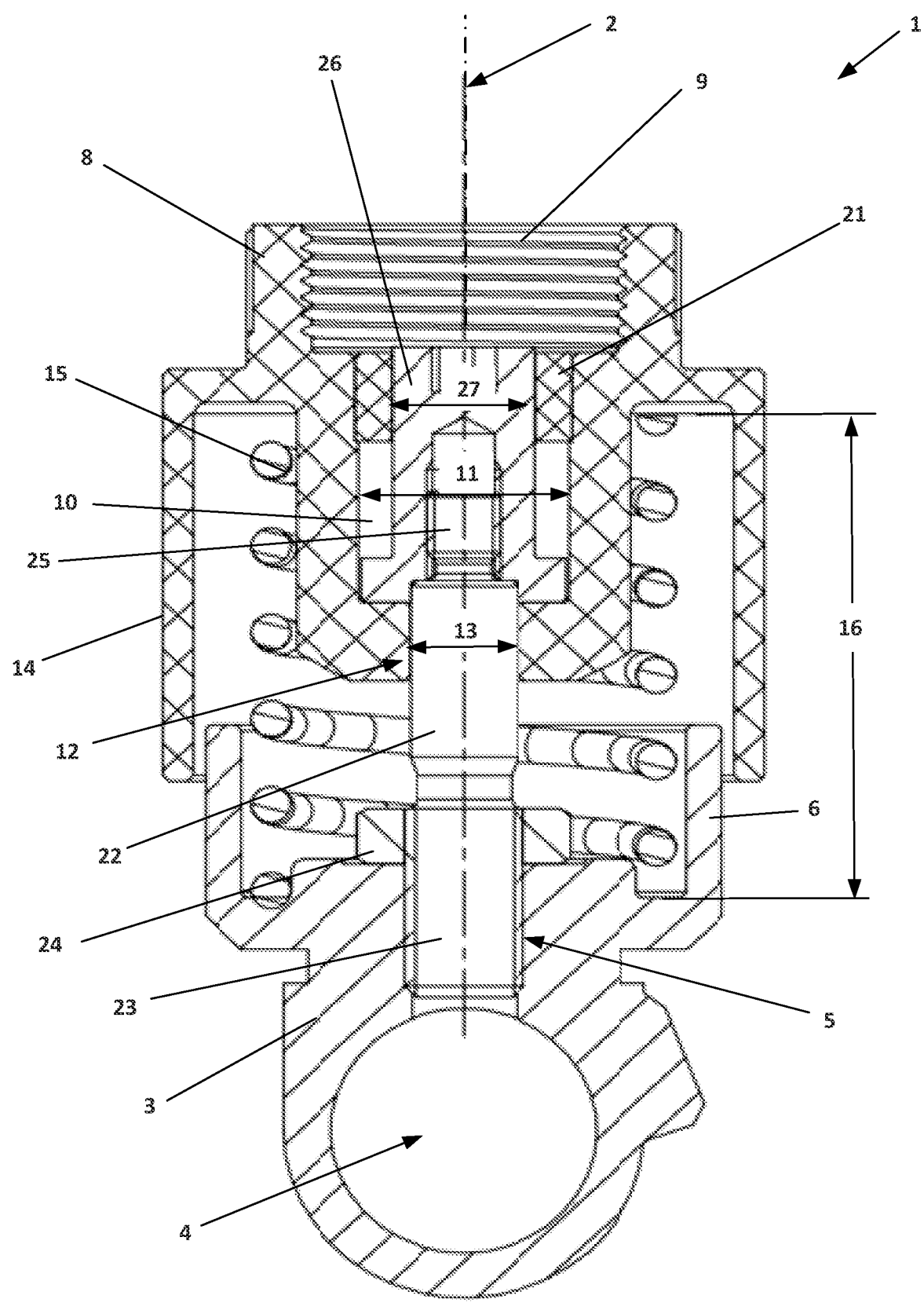
FIG. 2 is a schematic view of a second embodiment in a longitudinal section.

FIG. 2 shows a schematic view of a spring element 1 in a longitudinal section in a second embodiment. The spring element 1 has a longitudinal axis 2 and has a first element 3 and a second element 8 with a compression spring 15 held between the two elements 3 and 8. The two elements 3 and 8 are connected to one another in the longitudinal axis 2 via an axle pin 22. The axle pin 22 has a first threaded section 23 on an end facing the first element 3 with which section the axle pin 22 is inserted into a bore 5 having an internal thread. The screw connection between the axle pin 22 and the first element 3 is secured with a lock nut 24. Furthermore, the axle pin 22 has a second threaded section 25 on an end facing the second element 8 with which section the axle pin 22 is connected to a guide element 26. The function of the guide element 26 in conjunction with the axle pin 22 is equivalent to that of the connecting element 17 according to FIG. 1.

The first element 3 has a through opening 4 which is arranged perpendicularly to the longitudinal axis 2 and serves to accommodate an axle. In the first element 3, there is a tubular lug 6 which partially overlaps the compression spring 15.

The second element 8 is provided with an internal thread 9 on a side facing away from the first element 3 in the longitudinal axis 2. This serves for screwing in a shaft adapter (not shown). Starting from the internal thread 9, a guide opening 10 with an opening width 11 and a passage opening 12 having a diameter 13 follow in the longitudinal axis 3 in the direction of the first element 2. The opening width 11 is greater than the diameter 13 of the passage opening 12. The axle pin 22 reaches through the passage opening 12, and the guide element 26 is arranged in the guide opening 10. An outer diameter 27 of the guide element 26 is smaller than the diameter 11 of the guide opening 10 so that a guide sleeve 21 is accommodated between the guide element 26 and the second element 8 in the guide opening 10.

The axle pin 22 engages in the longitudinal axis 2 of the guide element 26 via the passage opening 12 of the second element 8 into the internal thread of the first element 3. Due to the fact that in the region of the guide opening 10 the diameter of the guide element 26 is greater than the diameter 13 of the passage opening 12, the second element 8 is pulled against the spring force of the compression spring 15 toward the first element 3 when the axle pin 22 is screwed together with the guide element 26, and accordingly the compression spring 15 is pretensioned to a height 16. The axle pin 22 is held stationary in the bore 5 of the first element 3 by the screw connection, whereas the second element 8 can slide back and forth on the guide element 26 in the direction of the longitudinal axis 2 when the compression spring 15 is compressed or relaxed. The second element 8 is linearly guided on the axle pin 22 in the region of the passage opening 12 and on the guide bushing 19 in the region of the guide element 26.

The second element 8 also has a sleeve 14 formed in the direction of the first element 3. The sleeve 14 is integrally formed onto the second element 8 and on the one hand encompasses the compression spring 15 and at least partially the lug 6 of the first element 3. Only a small annular gap remains between the lug 6 and the sleeve 14, so that the compression spring 15 and the axle pin 22 are protected from soiling. An arrangement of lug 6 and sleeve 14 is chosen so that even if the height 16 changes when the compression spring 15 moves, there is a sufficiently long overlap of the sleeve 14 over the lug 6 to protect the components.

Figure 3:
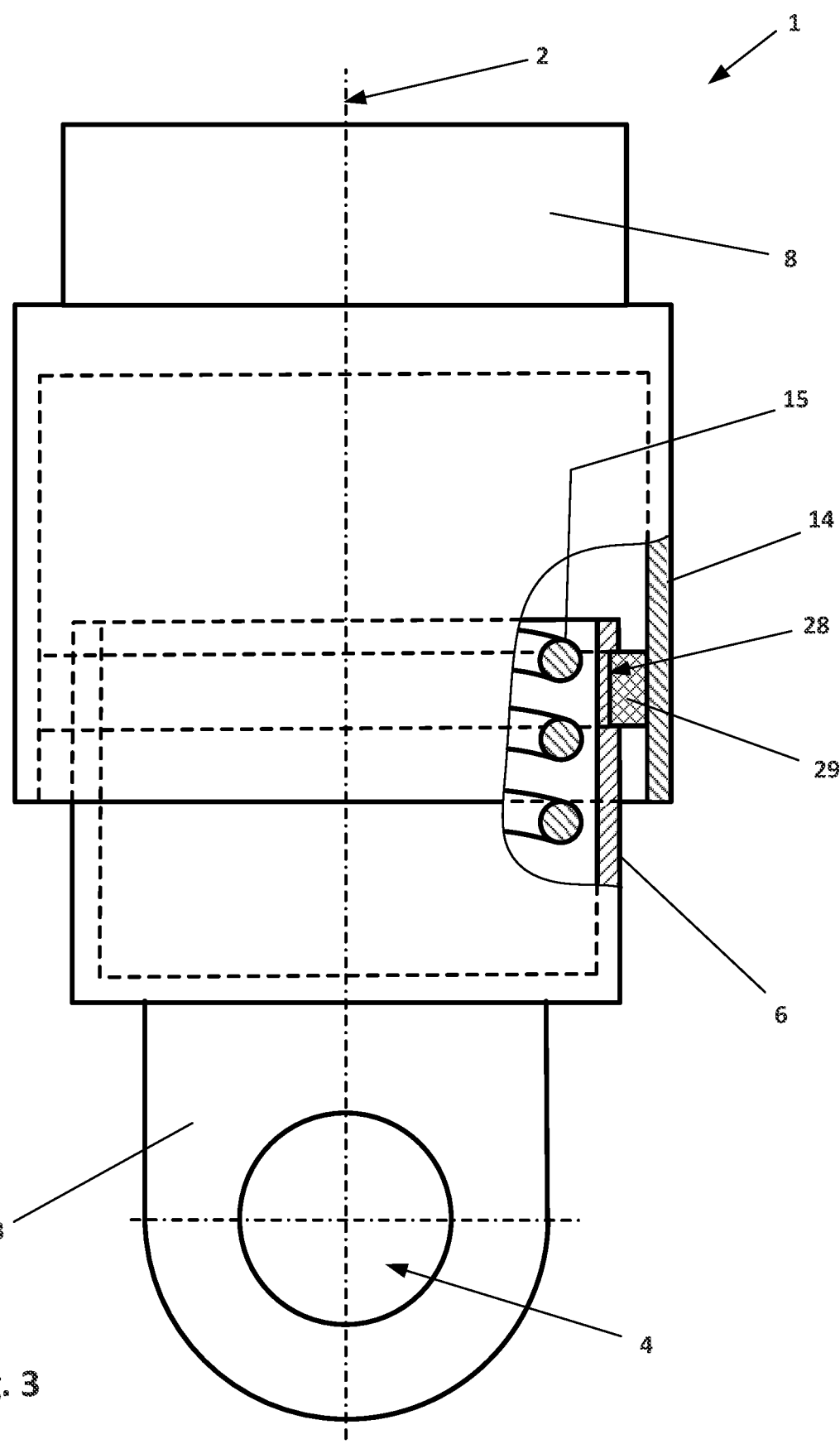
FIG. 3 is a schematic view of a third embodiment.

FIG. 3 shows a schematic representation of a spring element 1 in a third embodiment. The spring element 1 has a longitudinal axis 2 and has a first element 3 and a second element 8 with a compression spring 15 held between the two elements 3 and 8. Reference is made to FIGS. 1 and 3 for the connection of the two elements 3 and 8. The first element 3 has a lug 6 which is formed in the direction of the second element 8 and which partially encloses the spring 15. The second element 8 also has a sleeve 14 formed in the direction of the first element 3. The sleeve 14 is integrally formed onto the second element 8 and on the one hand encompasses the compression spring 15 and at least partially the lug 6 of the first element 3. Only a small annular gap remains between the lug 6 and the sleeve 14. A seal 29 is provided in this annular gap 30. In an exemplary representation, the seal is held in a groove 28, the groove 28 being formed in the lug 6 of the first element 3 oriented toward the annular gap 30. The seal 29 is held in position by the groove 28, so that an interior space containing the spring 15 is protected from dust and dirt even when the lug 6 and the sleeve 14 move relative to one another.

The present invention is not limited to the embodiments shown and described. Modifications within the scope of the claims are possible, as is a combination of the features, even if these are shown and described in different embodiments.

LEGEND

1 Spring element
2 Longitudinal axis
3 First element
4 Through opening
5 Bore
6 Lug
7 Lubricating nipple
8 Second element
9 Internal thread
10 Guide opening
11 Opening width
12 Passage opening
13 Passage opening diameter
14 Sleeve
15 Compression spring
16 Height of the compression spring
17 Connecting element
18 Connecting pin
19 Guide bush
20 Connecting element diameter
21 Guide sleeve
22 Axle pin
23 First threaded section
24 Locking nut
25 Second threaded section
26 Guide element
27 Guide element diameter
28 Groove
29 Seal

The invention claimed is:

1. A spring element for an upper nipper of a combing machine, comprising:
    a longitudinal axis;
    a first element comprising a through opening arranged transversely to the longitudinal axis for fastening to an axle, the first element further comprising a bore running in the longitudinal axis;
    a second element comprising an internal thread in along the longitudinal axis defined in an end side of the second element facing away from the first element, the second element further comprising a guide opening arranged in along the longitudinal axis adjacent to the internal thread with an opening width and a passage opening arranged in the longitudinal axis on a side of the guide opening facing away from the internal thread such that the guide opening is sandwiched along the longitudinal axis between the internal thread and the passage opening;
    the passage opening having a width that is less than the opening width of the guide opening;
    a compression spring arranged in the longitudinal axis between the first element and the second element;
    a connecting element held stationary in the longitudinal axis in the bore of the first element and projecting through the passage opening of the second element into the guide opening of the second element, the connecting element having a larger diameter on a side of the second element opposite the first element than a diameter of the passage opening;
    the first element comprising a tubular lug arranged in a longitudinal direction of the spring element and surrounding and partially overlapping the compression spring;
    the second element comprising a sleeve surrounding and overlapping the compression spring and the lug of the first element; and
    a seal between the sleeve and the lug, wherein the seal is held in a groove defined in the sleeve or the lug.

2. The spring element according to claim 1 wherein the seal is glued to the sleeve or to the lug.

3. The spring element according to claim 1 wherein the seal is made of felt or rubber.

4. The spring element according to claim 1, wherein the opening width of the guide opening is at least 1.4 times a diameter of the passage opening.

5. The spring element according to claim 1, wherein the bore in the first element has an internal thread, and the connecting element is screwed into the internal thread for a threaded connection therewith, and wherein one of a pin, lock nut, or adhesive secures the threaded connection.

6. The spring element according to claim 1, further comprising a guide sleeve inserted in the guide opening to guide the connecting element.

7. The spring element according to claim 1, wherein the connecting element comprises a connecting pin and a guide bush on the connecting pin at an end of the connecting pin facing the second element, the connecting pin having an outer threading at an end facing the first element for connection to the first element.

8. The spring element according to claim 7, wherein the connecting pin and the guide bush are formed in one piece.

9. The spring element according to claim 7, wherein the connecting element is guided by the connecting pin in the guide opening of the first element and by the guide bush in the guide sleeve of the second element.

10. The spring element according to claim 7, wherein a height of the compression spring is matched to a length of the connecting element such that a pre-tensioning of the compression spring is achieved by fastening of the connecting pin in the first element and in the second element.

* * * * *